United States Patent [19]
Diddens

[11] 4,157,553
[45] Jun. 5, 1979

[54] RECORDING ELECTRODE POWER LIMITING CIRCUIT FOR AN ELECTROGRAPHIC RECORDER

[75] Inventor: Paul A. Diddens, Denver, Colo.

[73] Assignee: Honeywell Inc., Minneapolis, Minn.

[21] Appl. No.: 805,530

[22] Filed: Jun. 10, 1977

[51] Int. Cl.² .................. G03G 15/044; G01D 15/06
[52] U.S. Cl. .................................... 346/154; 346/153
[58] Field of Search ............... 346/154, 162, 163, 165, 346/153, 150; 358/300

[56] References Cited

U.S. PATENT DOCUMENTS

| | | | |
|---|---|---|---|
| 3,500,433 | 3/1970 | Wasilewski | 346/165 |
| 3,534,165 | 10/1970 | Brouwer | 358/300 |
| 3,611,411 | 10/1971 | Moshier | 346/165 |
| 3,792,495 | 2/1974 | Bliss | 346/154 |
| 3,958,251 | 5/1976 | Borelli | 346/154 |
| 4,030,106 | 6/1977 | Bestenreiner | 346/153 |

FOREIGN PATENT DOCUMENTS 1401015  7/1975  Fed. Rep. of Germany ........... 346/154

Primary Examiner—Jay P. Lucas
Attorney, Agent, or Firm—Laurence J. Marhoefer; Lockwood D. Burton; Mitchell J. Halista

[57] ABSTRACT

A power limiting circuit for controlling recording electrode energizing power in an electrographic recorder having a plurality of electrographic recording electrodes has a voltage and current monitor circuit for detecting the changes in voltage and current being supplied to electrographic recording electrodes. The monitor circuit is used to maintain the current and voltage levels at predetermined reference levels by inhibiting the firing of preselected ones of the recording electrodes in a first and a second inhibit mode of operation. In the first inhibit mode, the firing of the even numbered electrodes is inhibited to maintain the predetermined power levels being supplied to the recording electrodes. The inhibiting operation is extended in the second inhibit mode to inhibit the odd numbered electrodes as well as the even numbered electrodes in alternate recording lines for a further limiting of electrode energization power to the recording head.

12 Claims, 7 Drawing Figures

F I G. I

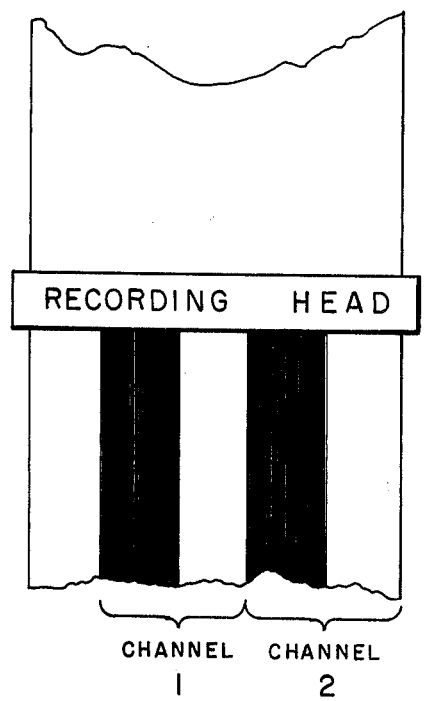
FIG. 2
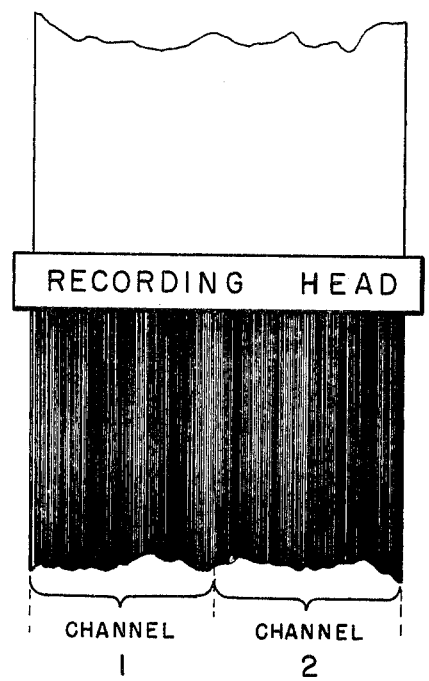
FIG. 4
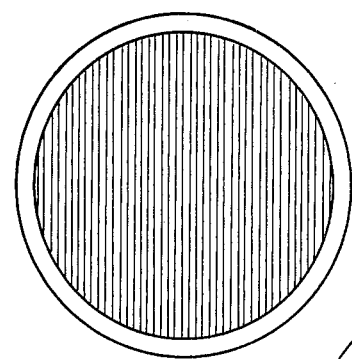
CHANNEL 1
FIG. 3A
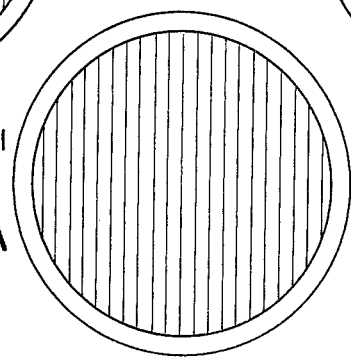
CHANNEL 1
FIG. 3B
CHANNEL 1
FIG. 5

4,157,553

RECORDING ELECTRODE POWER LIMITING CIRCUIT FOR AN ELECTROGRAPHIC RECORDER

BACKGROUND OF THE INVENTION

1. Field of the Invention

The present invention relates to electrographic recorders. More specifically, the present invention is directed to an electrode energization power limiting circuit for electrographic recorders.

2. Description of the Prior Art

Electrographic recorders having recording heads using a plurality of linearly arranged recording electrodes extending along a recording line across a recording medium are well-known in the art as found in U.S. Pat. Nos. 3,456,953; 3,465,359 and 3,465,360. While the use of such recorders for recording on electrosensitive paper, e.g., a recording medium having a substrate covered with an electric current vaporizable coating, e.g., aluminum, is well-known, the use of such recorders for high frequency recording is restricted by the amount of electrical power necessary for energizing the recording electrodes. Particularly, the event of recording an input analog signal having a frequency high enough to energize all of the recording electrodes on each successive recording line would give rise to excessive recording electrode power consumption. The recognition of this problem and its solution is neither shown nor suggested in the aforesaid prior art recorders. Accordingly, it is desirable to provide a recording electrode power limiting circuit to control the maximum power supplied to the electrographic recording head.

SUMMARY OF THE INVENTION

An object of the present invention is to provide an improved electrographic recorder having a recording electrode power limiting control circuit.

In accomplishing this and other objects, there has been provided, in accordance with the present invention, an electrographic recorder having a recording electrode power limiting circuit for inhibiting the recording operation of the recording electrodes in a first and a second inhibit mode of operation. The first inhibit mode inhibits the energization of even numbered electrodes in the linear array of recording electrodes and the second inhibit mode inhibits the energization of all of the recording electrodes in the electrographic recording head on alternate recording cycles. The first and second inhibit modes of operation may be used concurrently to provide a maximum limiting of the electrode energization power supplied to the electrographic recording head.

BRIEF DESCRIPTION OF THE DRAWINGS

A better understanding of the present invention may be had when the following detailed description is read in association with the accompanying drawings, in which:

FIG. 2 is a pictorial illustration of a recording operation using the recording apparatus shown in FIG. 1, FIG. 3A is an enlarged view of the recording operation shown in FIG. 2 and FIG. 3B illustrates one mode of operation of the present invention, FIG. 4 is a pictorial illustration of another recording operation using the recording apparatus shown in FIG. 1, FIG. 5 is an enlarged view of the recording operation shown in FIGS. 2 and 4 and illustrates another mode of operation of the present invention.

DETAILED DESCRIPTION

Figure 1:
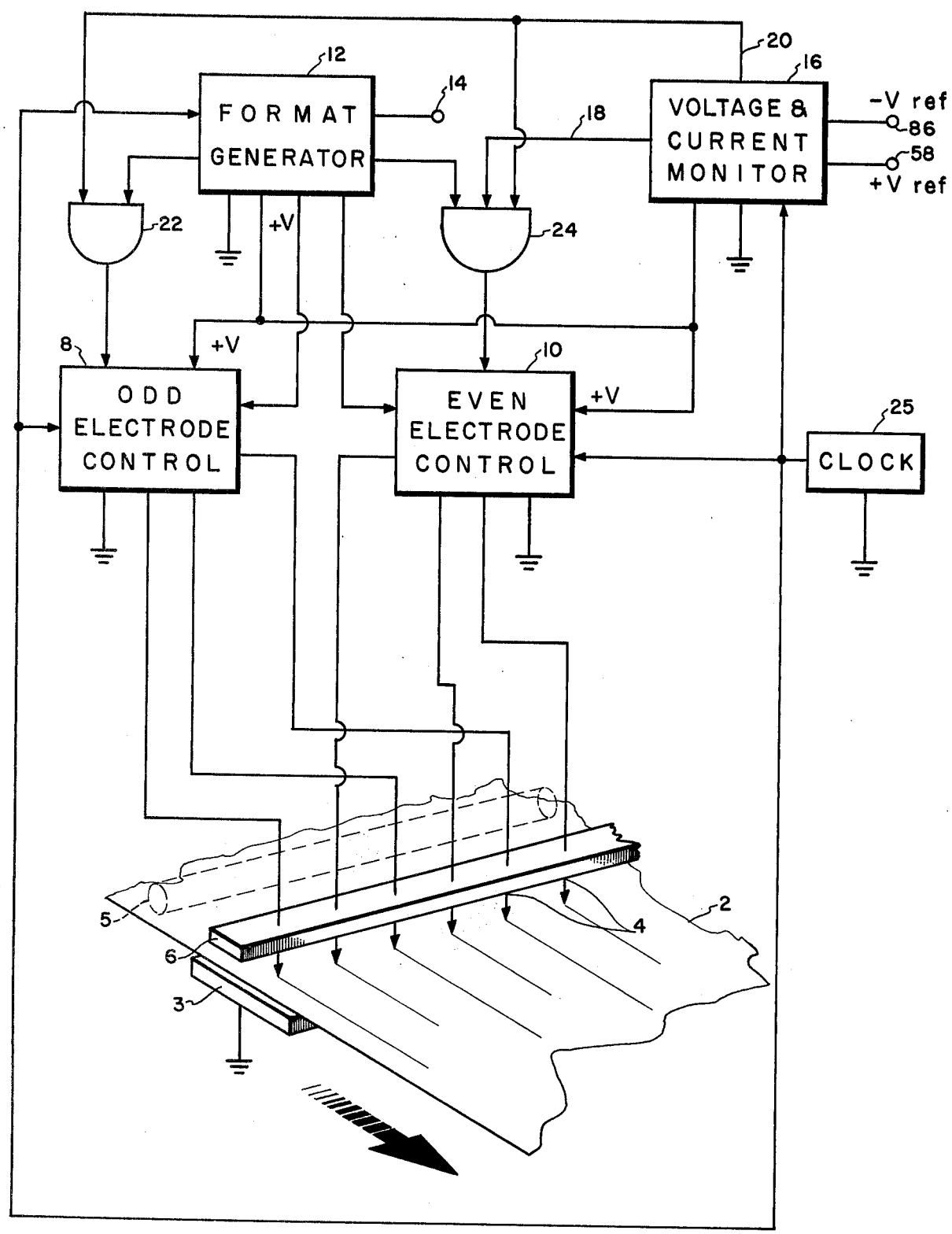
FIG. 1 is a block diagram of an electrographic recording apparatus embodying the present invention.

Referring to FIG. 1 in more detail, there is shown an electrographic recording system for recording an electrographic recording medium 2 which may be any suitable recording medium responsive to current flow from the recording electrodes. In the case of a recording medium which is arranged to conduct a recording electrical current therethrough, the medium would be supported on a ground platen 3 connected to ground or an electrical current return path. A current flow through the recording medium would produce a record mark on the recording medium in the contact area of a recording electrode 4. On the other hand, the use of a recording medium having an electrical current vaporizable coating, e.g., aluminum thereon, a ground roller 5 (shown in dotted outline) in contact with the coating would be used to provide an electrical current return path. Such recording mediums are well-known in the art, and their use and operation is conventional in the recorder of the present invention. A plurality of the recording electrodes 4 are linearly arranged in an electrographic recording head 6 and are individually energized according to their serially numbered location in the recording head 6 by either an odd electrode control 8 or an even electrode control 10.

A format generator 12 is used to supply control signals to the odd and even electrode control circuits 8 and 10 in response to input signals to be recorded applied to the format generator 12 from an input terminal 14. The format generator 12 may be any suitable device for converting an input signal to be recorded into a recording electrode control signal, such devices being well-known in the art as shown in the aforesaid patents. For example, the format generator 12 may include an analog-to-digital converter for converting an analog input signal into a digital count which is stored in a counter or register. The stored count signal is decoded to produce a corresponding electrode control signal for each stored count to selection control respective ones of recording electrodes 4. Concurrently, the format generator 12 is used to supply a periodic electrode firing control signal to the electrode control circuits 8 and 10 whereby the selected electrodes are actually energized at successive times, or clock intervals, during the occurrence of the firing control signal. Thus, the selection control signals select the electrodes for recording while the firing signal selects the recording time. The odd and even electrode control circuits may be simply gate circuits for connecting each recording electrode to a source of energizing current. The gate circuits for each electrode are controlled by the selection control signals and the firing control signal to energize a recording electrode, i.e., to connect a recording electrode to a source of electrode energizing current only during a coincidence of the selection and firing signals. The electrode selection signals from the format generator 12 are applied directly to the electrode control circuits 8, 10 while the firing control signals are applied to the electrode control circuits 8, 10 through AND gates as hereinafter described.

Figure 6:
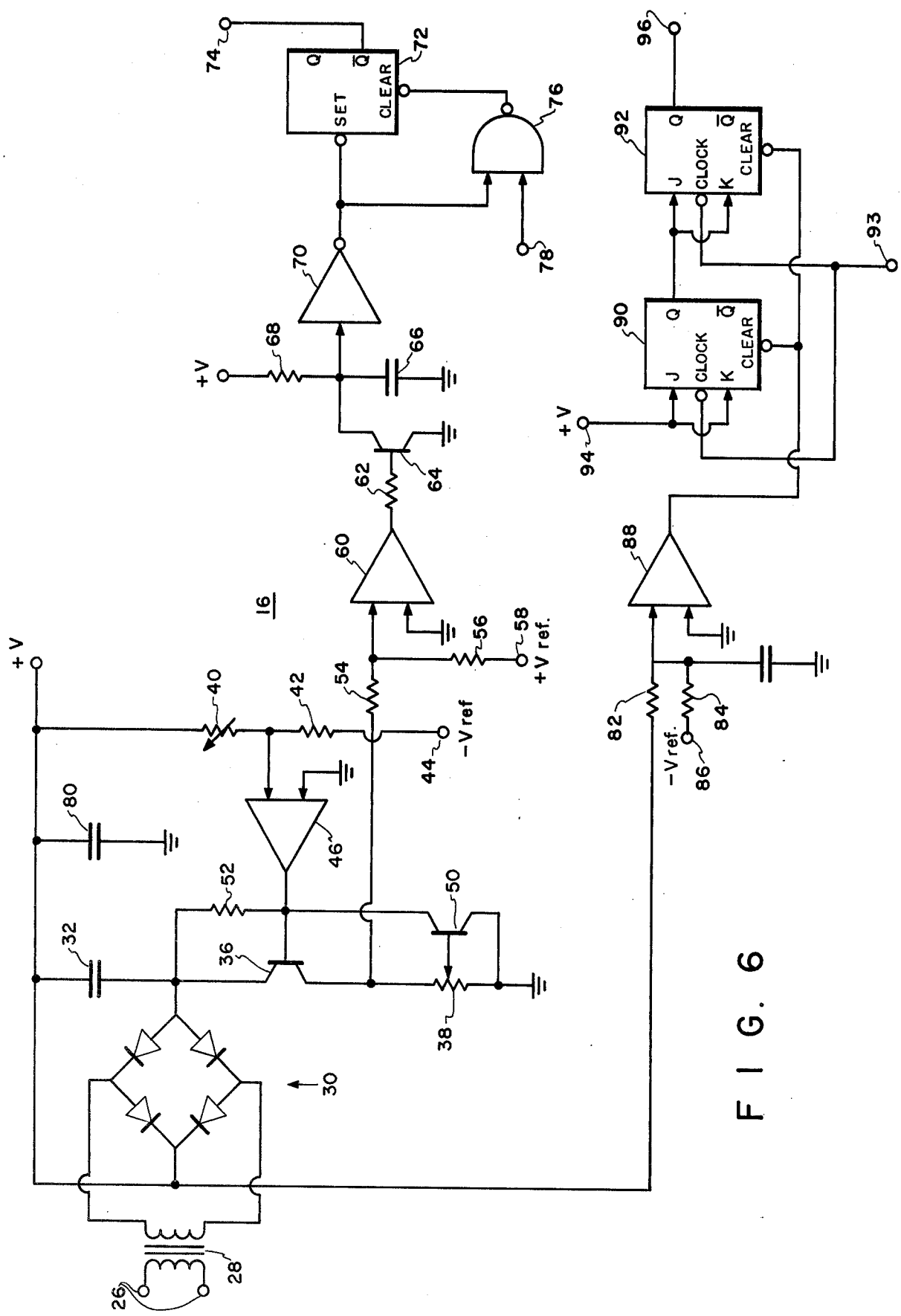
FIG. 6 is a detailed schematic illustration of a voltage and current monitor circuit suitable for use with the recording apparatus shown in FIG. 1.

A voltage and current monitor circuit 16 is arranged to monitor the electrode energization voltage and current supplied to the odd and even electrode control circuits 8 and 10 as a measure of the number of electrodes being used for recording, to produce a pair of inhibiting output signals on inhibit lines 18 and 20. A suitable circuit for use as the monitor circuit 16 is shown in FIG. 6 and discussed hereinafter. The electrode firing signals from the format generator 12 are applied to one input of a two input AND gate 22 having an output connected to the odd electrode control circuit 8 and a three input AND gate 24 having its output connected to the even electrode control circuit 10. The other input signal for the two input AND gate 22 is obtained from the inhibit line 20. The three input signals for the three input AND gate 24 are obtained from the electrode firing signal the format generator 12 and the inhibit lines 18 and 20 from the monitor circuit 16. Thus, the actual firing of the selected electrodes 4 in the recording head 6 is controlled by the voltage and current monitor circuit 16 by means of the AND gates 22 and 24. Concurrently the selection of the actual number, or identification, of the recording electrodes 4 to be fired for recording is controlled by the format generator 12, as discussed above. A block signal generator 25 is used to provide clock, or step, signals to the format generator 12, the electrode control circuits 8, 10 and the voltage and current monitor 16 to synchronize the operation thereof. The clock signals may also be used to control a recording medium transport (not shown) if an ncremental operation thereof synchronized with the recording operation is desired.

MODE OF OPERATION

The recorder shown in FIG. 1 is arranged to record on the recording medium 2 by supplying an electric current flow between the electrodes 4 selected by the format generator and either a ground platen 3 or a ground roller 5. The format generator 12 is arranged to select the electrodes 4 to produce a recording which is a representation of the wave shape of the input signal applied to the input terminal 14. If a square wave input signal of high enough frequency and amplitude were applied to the input terminal 14 the entire recording surface of the recording medium 2 contacted by the electrodes 4 would be recorded on due to the high signal density being recorded. If an average writing current of 2 mA/ips at a 30 volt supply voltage for the recording electrode 4 and an electrode width of 0.02 inches is used, the power consumption of an 8" recording medium width using an 8 ips recording medium speed is as follows:

$$P = VI \text{ (paper speed) (chart width)/line width}$$
$$P = \frac{30 \times 2 \times 10^{-3} \times 8 \times 8}{2 \times 10^{-2}} = 192 \text{ Watts}$$

On the other hand, in FIG. 2 there is shown a view of a recording in two recording channels with each channel having such a high frequency, high amplitude square wave input signal. The width of the actual recording is half of each recording channel which is sufficient to represent the amplitude of the recorded input signal while half of each recording channel is unused. While the only information that can be obtained from these recordings is amplitude information, i.e., no waveform information can be discerned, the recording electrode power demand is cut in half inasmuch as half of the recording medium and recording electrodes are not being used. Consequently, the power requirements for this recording operation using the figures given in the example above, is 96 watts. Using the circuit of the present invention shown in FIG. 1, the voltage and current monitor circuit 16 is arranged to detect this power demand level and to inhibit the firing of every other recording electrode of the recording electrodes 4 in a first inhibit mode of operation. Thus, an inhibit signal from the monitor circuit 16 is applied over inhibit line 18 to the three input AND gate 24 to inhibit the firing signal from the format generator 12 for the even electrode control circuit 10. Thus, only the recording electrodes controlled by the odd electrode control circuit 8 are allowed to fire under control of the format generator 12 and the firing control AND gate 22. Concurrently, the voltage and current monitor 16 continues to produce a gate energizing signal on the other control line 20 which signal is applied to the three input AND gate 24 and the two input AND gate 22. However, in view of the fact that the three input AND gate 24 is inhibited, or closed, by the control signal on the inhibit control line 18 only the two input AND gate 22 is opened to pass firing signals from the format generator 12. A detailed view of the recording produced by such a first inhibit mode operation is shown in FIG. 3 and is an enlarged partial view of the recording produced by the firing of only the odd electrodes in Channel 1. The power demand is now reduced to 48 watts, using the aforesaid numerical example. The first inhibit mode of operation reduces the apparent contrast of the recording, i.e., the difference in appearance between the recorded area of the recording channels and the unrecorded area between the channels. However, the amplitude of the recorded presentation is not affected.

If the recording level is now increased so that the total recording amplitude for each input signal is the full width of the corresponding recording channel as shown in FIG. 4, the continued inhibiting of the even electrode firing would still produce a power drain of 96 watts. Another portion of the voltage and current monitor circuit 16 is arranged to sense this increase in power demand and to inhibit in a second inhibit mode the writing by all of the electrodes 4 of alternate pairs of recording lines, i.e., every other pair of firing of the electrodes 4. To achieve this second inhibit mode of operation, the control line 20 from the voltage and current monitor circuit is supplied with an inhibit signal on alternate pairs of electrode firing operations which inhibit signal is applied to both of the AND gates 22 and 24 to prevent the firing of the odd and even recording electrodes. It will be noted, however, that the situation described is an expansion of the previous operation in which case the even electrode firing has already been inhibited by the inhibit control signal on line 18. A detailed view of this second inhibit mode recording operation is shown in FIG. 5 as an enlarged view of a portion of the recording in Channel 1. This second inhibit mode, or full inhibit, operation reduces the power consumption back to 48 watts and reduces the contrast of the recording even further. However, the amplitude information is still preserved with a maximum limitation of the recording electrode power.

A suitable circuit for use as the voltage and current monitor circuit 16 is shown in FIG. 6 and includes a pair of input terminals 26 suitable for connecting the circuit to a source of alternating current, i.e., AC, power. The input terminals 26 are connected to the input winding of a power transformer 28. The output winding of the transformer 28 is connected across a diagonal of a conventional diode bridge circuit 30 and a filter rectifier circuit including a filter capacitor 32 connected across another diagonal of the bridge circuit 30 to produce a direct current, i.e., DC, output signal +V. A first transistor 36 is connected with its emitter-collector path in series between the negative end of the filter capacitor 28 and one end of a potentiometer 38. The other end of the potentiometer 38 is connected to ground. The transistor 36 is used to absorb the voltage difference between the DC voltage across the filter capacitor 32 and the regulated DC output signal +V. Specifically, the first transistor 36 is arranged to change its internal impedance in response to a base input to effect a voltage drop thereacross to absorb the changes in the unregulated DC voltage across the filter capacitor 32 to maintain the output DC voltage +V constant. The output DC voltage +V is connected by a series pair of output resistors 40 and 42 to a minus reference voltage −V connection terminal 44. The junction between the resistors 40 and 42 is connected to the non-inverting input of a first comparator 46, e.g., a differential amplifier. The inverting input of the comparator 46 is connected to ground. Thus, the comparator 46 compares the voltage at the junction between the resistors 40 and 42 with ground. Any error in the +V output signal is divided by the ratio between the resistors 40 and 42 and is applied to the non-inverting input of the comparator 46. The output of the comparator 46 is applied as a base drive current to the base of the first transistor 36 to adjust the aforesaid transistor current flow by a control of the effective transistor internal impedance to maintain the DC output voltage +V. The first resistor 40 may be an adjustable resistor to allow the DC supply circuit to be used with other output DC voltages.

The potentiometer 38 is used to monitor the current through the first transistor 36 by developing an output voltage thereacross. A portion of the voltage drop across the potentiometer 38 is picked up by the slider thereon and is applied to the base of a second transistor 50. The second transistor 50 has its emitter-collector path connected between a resistor 52 which is connected to the negative end of the filter capacitor 32, and ground and its collector connected to the base of the second transistor 30. The slider on the potentiometer 38 is adjusted so that a particular current through the potentiometer 38 produces an output signal which is of sufficient magnitude to turn on the second transistor 50. The conducting state of the second transistor 50 bypasses the excess base drive current from the output of the comparator 46 to ground. Such a conduction by transistor 50 serves to limit the emitter-collector current through the first transistor 36 to the aforesaid predetermined value. The voltage drop across the potentiometer 38 is applied through a series pair of resistors 54 and 56 to a positive reference voltage (+V ref.) connection terminal 58. The junction between the resistors 54 and 56 is connected to the non-inverting input of a second comparator 60 which is a switching comparator that switches its output between a pair of levels in response to the comparison of the input signals thereto. The inverting input of the comparator 60 is connected to ground. The output signal from the second comparator 60 is applied through a resistor 62 to the base of a third transistor 64. The emitter-collector path of the third transistor 64 is connected across a control capacitor 66 having one side connected to ground and the other side connected to the +V supply through a charging resistor 68. The junction between the resistor 68 and the capacitor 66 is connected through an inverter 70 to the "set" input of a first flip-flop 72. The $\overline{Q}$ output of the flip-flop 72 is connected to an inhibit signal output terminal 74 which, in turn, is connected to the control line 18 shown in FIG. 1. The output of the inverter 70 is also connected to one input of a two input NAND gate 76. The output signal of the NAND gate 76 is connected to the "clear" input terminal of the first flip-flop 72. The other input of the NAND gate 76 is connected to an input terminal 78 for connection to a source of a clock, or step, signal.

The +V supply line from the positive side of the filter capacitor 32 is also connected to one side of an output capacitor 80 having its other side connected to ground. Concurrently, the +V supply line is also connected through a series pair of resistors 82 and 84 to a minus reference voltage (−V ref.) connection terminal 86. The junction between the resistors 82 and 84 is connected to the inverting input of a third comparator 88, which is also a switching comparator, having its non-inverting connected to ground. The output of the third comparator 88 is connected to the "clear" input of a second flip-flop 90 and a third flip-flop 92. The second and third flip-flops 90 and 92 are each J–K flip-flops with the second flip-flop 90 having its J–K inputs connected to a bias signal input terminal 94 for connection to a fixed magnitude bias signal. The J–K inputs of the third flip-flop 92 are connected to the "Q" output of the second flip-flops 90. The clock input of the second and third flip-flops 90 and 92 are both connected to a clock signal terminal 93 for connection to the clock signal source 25. The Q output of the third flip-flop 92 is connected to an output terminal 96 for connection to the inhibit signal control line 20 shown in FIG. 1.

The circuit shown in FIG. 6 monitors the current and voltage being supplied to the recording system to produce the output inhibit signals on the output terminals 74 and 96 for limiting the power used by the recording system. Thus, a zero or "low" state from the $\overline{Q}$ output of the first flip-flop 72 inhibits recording by all of the even electrodes, by means of the three input AND gate 24 shown in FIG. 1, if the monitored recording current drain is greater than a predetermined limit. The Q output of the third flip-flop 92, on the other hand, goes to a low, or zero, state to inhibit the firing of the recording electrodes on alternate pairs of recording cycles, or recording lines. Specifically, the current for firing the electrodes is drawn from the output capacitor 80. Since this capacitor is recharged through the first transistor 36 and the potentiometer 38, the voltage drop across the potentiometer 38 is an indication of the current drain used to recharge the output capacitor 80. The maximum current through the transistor 36 and the potentiometer 38 occurs when the output capacitor 80 is being recharged following the firing of a group of electrodes. If the output capacitor 80 completely recharges before the firing of another group of electrodes, the voltage drop across the potentiometer 38 decreases to zero. However, if the capacitor charge current does not drop below the predetermined current limit, the voltage drop across the potentiometer 38 stays at its maximum level. This change in waveform is detected by the comparator 60 to signal an overcurrent condition as a result of an attempt to record an overly dense recording pattern. If the voltage drop across the potentiometer 38 drops below the trigger level of the second comparator 60, the voltage divider resistors 54 and 56 apply a portion of this voltage drop to the non-inverting input of the second comparator 60 to cause the comparator output to go positive. This input level state drives, or switches, the output of the comparator 60 to a positive level to turn on the third transistor 64. The conducting state of the third transistor 64 discharges the capacitor 66 to await another recharge cycle of the output capacitor 80, i.e., the recharge cycle of the output capacitor 80 is monitored to determine whether or not, the inhibiting of the even electrodes is to be maintained for another recording cycle.

When the voltage drop across the potentiometer 38 returns to a negative level representative of another recharge cycle for the output capacitor 80, the output signal from the second comparator 60 is switched to a low level signal to turn off the third transistor 64. The non-conducting state of the third transistor 64 allows the capacitor 66 to start charging through the resistor 68 from the positive supply +V. If the voltage drop across the potentiometer 38 stays more negative than the trigger level of the second comparator 60, which state is indicative of an overload or high current condition, the third transistor 64 is maintained in a non-conductive state. The non-conductive state of the third transistor 64 enables the capacitor 66 to charge to a positive level, i.e., it approaches the positive supply +V, which capacitor level is inverted by the inverter 70 and is used to "set" the first flip-flop 72. In the "set" state of the first flip-flop 72, the $\overline{Q}$ output is low, and this low level signal is applied to the even electrode control AND gate 24 by means of the output terminal 74 and the inhibit signal control line 18. In this state, the AND gate 24 is inhibited from passing electrode firing signals from the format generator 12 to the even electrode control circuit 10 which inhibits in a first inhibit mode the firing of the even-numbered electrodes in the recording head 6. Since at this time only the selected odd electrodes in the recording head 6 are fired by the format generator 12 and the odd electrode control 8, the current demand is immediately reduced by one-half to remove the current overload condition. The setting of the first flip-flop 72 may be delayed by adjusting the charging time of the capacitor 66 to allow for an initial firing of all of the recording electrodes if time lines are being recorded on the recording medium 2.

The next clock signal applied to the clock signal terminal 78 is applied to the NAND gate 76. If the overload condition has been actually terminated, the output of the inverter 70 is restored to a high level state to enable the NAND gate 76, and the clock signal is, accordingly, passed by the NAND gate 76 to clear the first flip-flop 72. The clearing of this flip-flop restores the high level output signal on the $\overline{Q}$ output to allow the subsequent firing of the even-numbered recording electrodes. On the other hand, if the current overload condition still exists, the capacitor 66 is retained in a charged state which maintains a low level output from the inverter 70 whereby the NAND gate 76 is closed by the low level signal on the output of the inverter 70. In this state, the clock signal is blocked by the NAND gate 76 and is unable to clear the flip-flop 72, and the inhibiting of the even-numbered electrodes is maintained.

In the event that the overload condition of the +V supply is increased beyond that monitored by the current limit monitor and the current limit monitor is already functioning as described above, to inhibit the even-numbered electrodes, the output voltage +V will start to decrease since the regulator circuit for the +V supply has a current limit and cannot recharge the output capacitor 80 to its full level. The voltage across the output capacitor 80 is monitored by the third comparator 88 through the voltage divider resistors 82 and 84. When the voltage +V drops below a certain level as determined by the level of the −V reference signal applied to the reference input terminal 86, the output of the third comparator 88 is driven to a high level state which terminates the "clear" signal from inverted "clear" inputs of the second and third flip-flops 90 and 92. Since the flip-flops 90 and 92 are, effectively, connected in a divide-by-four counter configuration, the application of a "clock" signal to the "clock" signal input terminal 93 is effective to step the flip-flops 90 and 92. The "Q" output of the third flip-flop 92, which controls the firing of all of the recording electrodes by AND gates 22 and 24, is driven to a high level state for every other pair of clock signals. Thus, alternate pairs of "clock" pulses prevent the firing of the recording electrodes 4 for every other pair of recording lines in the second inhibit mode. Specifically, the Q output of the third flip-flop 92 is in a low level state for every other pair of clock signals and this low level state is applied by means of output terminal 96 and inhibit line 20 to inhibit the operation of the AND gates 22 and 24. The inhibiting of the firing of all of the electrodes 4 by means of the inhibit signal on the inhibit control line 20 during alternate pairs of clock signals is effective to further reduce the average current drain by the recording electrodes by one half.

If the density of the recording and the current drain of the +V supply is subsequently decreased, the voltage level +V of the +V supply is first restored to its regulated level. The voltage monitor comparator 88 detects this +V level and is reset to a low level output state, which state clears the flip-flops 90 and 92 to restore a high level output from the Q output of the third flip-flop 92. The high level Q output of the third flip-flop 92 enables the firing of the odd-numbered electrodes. Subsequently, if the recording density is further decreased, the current monitor circuit 60 is enabled by a decrease of the average current below the current limit level to restore the conducting state of the third transistor 64 by a high level output from the comparator 60 to prevent the recharging of the capacitor 66. In this state, the next clock signal is passed by the NAND gate 76 to clear the first flip-flop 72 to restore a high level output of the $\overline{Q}$ output from the flip-flop 72. The high level $\overline{Q}$ output of the flip-flop 72 terminates the inhibit operation of the AND gate 24 and enables the firing of the even-numbered electrodes.

Accordingly, it may be seen that there has been provided, in accordance with the present invention, an improved multielectrode electrographic recording apparatus having means for limiting the recording electrode current selectively inhibiting the recording of recording electrodes while maintaining a modified recording operation by predetermined groups of recording electrodes.

The embodiments of the invention in which an exclusive property or privilege is claimed are defined as follows:

1. In an electrographic recorder having a plurality of recording electrodes which are individually selected and energized to record on a recording medium, the improvement comprising recording electrode energizing current and voltage supply means, current and voltage monitor means connected to said supply means and responsive to the recording electrode enerigizing current and voltage supplied to operate the recording electrodes, said monitor means being arranged to produce an inhibit control signal representative of an excessive variation in the monitored energizing current and voltage, signal gate means, format generator means for selecting ones of said recording electrodes according to a recording format representative of an input signal to be recorded, said format generator means producing an electrode selection signal and an electrode firing control signal, electrode control means responsive to said electrode selection signal and said electrode firing control signal for operating said recording electrodes by applying said energizing current and voltage from said supply means to selected ones of said recording electrodes, first circuit means for applying said electrode selection signal to said electrode control means, second circuit means for applying said electrode firing signal as an input signal to be gated to said gate means, third circuit means for applying said inhibit control signal as a gate control signal to said gate means, and fourth circuit means for applying an output signal from said gate means as an electrode firing signal to said electrode control means.

2. The electrographic recorder improvement as set forth in claim 1 wherein said gate means includes a first AND gate means and a second AND gate means and said recording electrode control means includes an odd numbered electrode control means having outputs connected to odd numbered recording electrodes and an even numbered electrode control means having outputs connected to even numbered recording electrodes and said fourth circuit means includes a fifth circuit means connecting an output from said first AND gate means to a firing control signal input of said odd electrode control means and a sixth circuit means connecting an output of said second AND gate means to a firing control signal input of said even electrode control means, said first circuit means connecting said electrode selection signal to said odd and even control means.

3. The electrographic recorder improvement as set forth in claim 2 wherein said voltage and current monitor means includes current monitoring means for monitoring a recording electrode energizing current to produce a first inhibit control signal for application to said first AND gate means and a voltage monitoring means to produce a second inhibit control signal for application to said first and second AND gate means.

4. The electrographic recorder improvement as set forth in claim 3 wherein said current monitoring means includes a resistor in an electrode energizing current path, first means for comparing a voltage drop across said resistor with a first reference voltage to produce a first and a second output signal representative of a first and a second relationship between said voltage drop and said reference voltage, respectively, and first inhibit signal generating means responsive to said first output signal from said first means for comparing to produce said first inhibit signal and said voltage monitoring means includes a second means for comparing an electrode energizing current supply voltage with a second reference voltage to produce a first and a second output signal representative of a first and a second relationship between said supply voltage and said second reference voltage, respectively, and second inhibit signal generating means respective to said first output signal from said second means for comparing to produce said second inhibit signal.

5. The electrographic recorder improvement as set forth in claim 4 wherein said first inhibit signal generating means further includes first flip-flop means responsive to said first output signal from said first means for comparing to produce a first flip-flop means output signal as said first inhibit signal and said second inhibit signal generating means includes second flip-flop means responsive to said first output signal from said first means for comparing to produce said second inhibit signal.

6. The electrographic recorder improvement as set forth in claim 5 wherein said first and said second flip-flop means includes means for connecting said first and second flip-flop means to a source of clock signals for resetting said first and second flip-flop means to selectively terminate said first and second inhibit signals.

7. A method of operating a recorder having a plurality of recording electrodes arranged to respond to an energizing current and voltage for recording on a recording medium, including the step of converting an input signal to be recorded into a selective energization of the recording electrodes, monitoring the energizing current and voltage supplied to the recording electrodes and selectively inhibiting the recording by said recording electrodes when the monitored energization current and voltage exceeds predetermined respective limits and including the further steps of inhibiting the recording by a first group of electrodes in a first inhibit mode of operation when the monitored energization current exceeds a predetermined limit and inhibiting the recording of a second group of electrodes in a second inhibit mode of operation when the monitored energization voltage exceeds a predetermined limit.

8. A method as set forth in claim 7, wherein said second group of electrodes includes said first group of electrodes.

9. A method as set forth in claim 7, wherein said first group of electrodes are even numbered electrodes 10. In an electrographic recorder having a plurality of recording electrodes which are individually selected and energized to record on a recording medium, the improvement comprising recording electrode energizing current supply means, current monitor means connected to said supply means and responsive to the recording electrode energizing current supplied to operate the recording electrodes, said monitor means being arranged to produce an inhibit control signal representative of an excessive variation in the monitored energizing current, recording electrode firing signal generating means,
means for selecting ones of said recording electrodes according to a recording format representative of an input signal to be recorded by an electrode selection signal, electrode control means responsive to said electrode selection signal and said electrode firing signal for operating said recording electrodes by applying said energizing current from said supply means to selected ones of said recording electrodes, first circuit means for applying said electrode selection signal to said electrode control means, second circuit means for applying said electrode firing signal to said electrode control means and third circuit means for applying said inhibit control signal as a control signal to said firing signal generating means to inhibit said firing signal generating means.

11. In an electrographic recorder having a plurality of recording electrodes which are individually selected and energized to record on a recording medium, the improvement comprising recording electrode energizing power supply means, current and voltage monitor means connected to said supply means and responsive to the recording electrode energizing power supplied to operate the recording electrodes, said monitor means being arranged to produce an inhibit control signal representative of an excessive variation in the monitored electrode energizing power, recording electrode firing signal generating means, means for selecting ones of said recording electrodes according to a recording format representative of an input signal to be recorded by an electrode selection signal, electrode control means responsive to said electrode selection signal and said electrode firing signal for operating said recording electrodes by applying said energizing power from said supply means to selected ones of said recording electrodes, first circuit means for applying said electrode selection signal to said electrode control means, second circuit means for applying said electrode firing signal to said electrode control means and third circuit means for applying said inhibit control signal as a control signal to said firing signal generating means to inhibit said firing signal generating means.

12. The electrographic recorder improvement as set forth in claim 11, wherein said firing signal generating means includes a first firing signal generating means and a second firing signal generating means and said recording electrode control means includes first electrode control means having outputs connected to a first group of recording electrodes and a second electrode control means having outputs connected to a second group of recording electrodes and said third circuit means applies said inhibit control signal to said first electrode control means, said second circuit means connects said first generating means and said second generating means to said first and second electrode control means, respectively, and said first circuit means connects said electrode selection signal to said first and second electrode control means.

* * * * *